United States Patent [19]
Kuhl

[11] Patent Number: 5,791,867
[45] Date of Patent: Aug. 11, 1998

[54] APPARATUS FOR AUTOMATICALLY UNSTACKING OF TRAYS FROM A VERTICALLY EXTENDING INTERLOCKING STACK THEREOF

[76] Inventor: Jeffrey B. Kuhl, 61 Kuhl Rd., Flemington, N.J. 08822

[21] Appl. No.: 784,667

[22] Filed: Jan. 21, 1997

[51] Int. Cl.⁶ .................................................. B65G 59/10
[52] U.S. Cl. .......................... 414/795.6; 414/773; 414/783; 414/796.9
[58] Field of Search .................................. 414/763, 773, 414/783, 739, 795.6, 796.4, 796.7, 796.9; 221/217

[56] References Cited

U.S. PATENT DOCUMENTS

| | | | |
|---|---|---|---|
| 3,912,070 | 10/1975 | Cronk et al. | |
| 4,221,519 | 9/1980 | Nord et al. | |
| 4,302,142 | 11/1981 | Kuhl et al. | 414/796.9 X |
| 4,355,939 | 10/1982 | Musgrave | 414/413 |
| 4,403,900 | 9/1983 | Thomas | |
| 4,588,341 | 5/1986 | Motoda | |
| 4,592,692 | 6/1986 | Suizu et al. | |
| 4,642,013 | 2/1987 | Mundus et al. | |
| 4,648,771 | 3/1987 | Yoshioka | |
| 4,710,089 | 12/1987 | Schneider | |
| 4,768,913 | 9/1988 | Baba | |
| 4,820,103 | 4/1989 | Dorner et al. | 414/790 |
| 4,824,308 | 4/1989 | Carboniero et al. | 414/797 |
| 4,865,515 | 9/1989 | Dorner et al. | 414/788.2 |
| 4,909,412 | 3/1990 | Cerf | 221/1 |
| 4,915,578 | 4/1990 | Becker | 414/797.6 |
| 4,979,870 | 12/1990 | Mojden et al. | 414/788.4 |
| 4,988,263 | 1/1991 | Odenthal | 414/795.8 |
| 4,997,339 | 3/1991 | Antonis | 414/791.2 |
| 5,069,597 | 12/1991 | Doctor | 414/788.7 |
| 5,112,181 | 5/1992 | Rasmussen | 414/416 |
| 5,169,283 | 12/1992 | Covert | 414/793.7 |
| 5,348,441 | 9/1994 | Takemasa et al. | 414/796.7 |
| 5,391,051 | 2/1995 | Sabatier et al. | 414/797.2 |
| 5,545,001 | 8/1996 | Capdeboscq | 414/790.8 |
| 5,556,252 | 9/1996 | Kuster | 414/796.7 |

FOREIGN PATENT DOCUMENTS

| | | | |
|---|---|---|---|
| 262340 | 10/1988 | Japan | 414/796.9 |
| 1-122829 | 5/1989 | Japan | 414/796.9 |

*Primary Examiner*—Janice L. Krizek
*Attorney, Agent, or Firm*—Sperry, Zoda & Kane

[57] ABSTRACT

An apparatus for separating stacks of detachably interlocking totes or trays one at a time by removal at the uppermost tray for processing thereof such as cleaning, sanitizing or otherwise refurbishing. The apparatus includes an elevating platform for maintaining the position of the uppermost tray in a stack thereof at a pre-specified vertical position defined by a sensing device such as a photocell. A tray gripping apparatus having a pivot arm and a gripping head is adapted to selectively grasp the uppermost tray from the top of a stack while at the same time a stack returning device is adapted to clamp the remaining portion of the stack downwardly. The tray is removed and moved through a 180 degree arc where it is released at the output station for cleaning or other service. A main beam member is pivotally mounted to the frame to achieve the back and forth pivotal movement for removal of the top tray one at a time from the stack thereof.

20 Claims, 3 Drawing Sheets

1

APPARATUS FOR AUTOMATICALLY UNSTACKING OF TRAYS FROM A VERTICALLY EXTENDING INTERLOCKING STACK THEREOF

BACKGROUND OF THE INVENTION

1. Field of the Invention

The present invention deals with the field of devices for materials handling. In particular, the materials to be handled in the present invention comprise trays or totes or tubs used in various industries but particularly found used in the poultry industry. Such trays or tubs can interlock with respect to one another by being placed within one another to form a compact, vertically extending stack. However, they are easily detachable from interlocking with respect to one another by exerting vertical pressure during removal.

Such trays or totes are normally handled in stacks of 10, 20 or even greater in order to facilitate handling and minimize labor costs. These stacks of trays need to be separated in order to allow refurbishing of the individual trays such as washing, sanitizing, drying and other cleaning operations normally required periodically. The present invention provides an automated means for separating stacks of trays such that they can be processed as desired.

2. Description of the Prior Art

Examples of prior art devices utilized for such materials handling applications are shown in U.S. Pat. No. 3,912,070 patented Oct. 14, 1975 to Vern V. Cronk et al and assigned to Baker Perkins, Inc. on a "Tray Handling Apparatus"; and U.S. Pat. No. 4,221,519 patented Sep. 9, 1980 to K. Nord et al and assigned to Ex-Cell-O Corporation on a "Conveying And Stacking Machine"; and U.S. Pat. No. 4,355,939 patented Oct. 26, 1982 to H. J. Musgrave on a "Palletized Poultry Coop Handling System"; and U.S. Pat. No. 4,403,900 patented Sep. 13, 1983 to P. M. Thomas and assigned to Builders Equipment Company on a "Pallet Storing And Distributing Apparatus"; and U.S. Pat. No. 4,588,341 patented May 13, 1986 to K. Motoda and assigned to Motoda Denshi Kogyo Kabushiki Kaisha on an "Article Delivery Apparatus"; and U.S. Pat. No. 4,592,692 patented Jun. 3, 1986 to D. Suizu et al and assigned to Okura Yusoki Kabushiki Kaisha on a "Pallet Loading Apparatus"; and U.S. Pat. No. 4,642,013 patented Feb. 10, 1987 to F. Mundus et al and assigned to Windmoller & Holscher on an "Apparatus For Stacking Flat Articles"; and U.S. Pat. No. 4,648,771 patented Mar. 10, 1987 to I. Yoshioka on a "Robot Hand For Stacking Boxes"; and U.S. Pat. No. 4,710,089 patented Dec. 1, 1987 to T. Schneider and assigned to Velten & Pulver, Inc. on an "Article Unstacking System"; and U.S. Pat. No. 4,768,913 patented Sep. 6, 1988 to K. Baba and assigned to Kabushiki Kaisha Komatsu on a "Destacker"; and U.S. Pat. No. 4,820,103 patented Apr. 11, 1989 to W. C. Dorner et al and assigned to Dorner Mfg. Corp. on an "Apparatus For Vertically Stacking And Storing Articles"; and U.S. Pat. No. 4,824,308 patented Apr. 25, 1989 to F. Carboniero et al and assigned to Omera Spa on a "Separating And Lifting Device For Stacked-Up Flat Elements"; and U.S. Pat. No. 4,865,515 patented Sep. 12, 1989 to W. Dorner et al and assigned to Dorner Mfg. Corp. on an "Apparatus For Unstacking And Stacking Containers"; and U.S. Pat. No. 4,909,412 patented Mar. 20, 1990 to A. Cerf and assigned to Polycerf Inc. on "Machines And Methods For Separating Nested Trays"; and U.S. Pat. No. 4,915,578 patented Apr. 10, 1990 to H. Becker and assigned to Total Tote, Inc. on a "Bin Unstacking Machine"; and U.S. Pat. No. 4,979,870 patented Dec. 25, 1990 to W. Mojden et al and assigned to Fleetwood Systems, Inc. on an "Automatic Tray Loading, Unloading and Storage System"; and U.S. Pat. No. 4,988,263 patented Jan. 29, 1991 to H. Odenthal and assigned to Ostma Maschinebau GmbH on an "Apparatus For The Destacking Of Pallets"; and U.S. Pat. No. 4,997,339 patented Mar. 5, 1991 to M. Antonis and assigned to FPS Food Processing Systems, B.V. on a "Device For Stacking Trays With Articles"; and U.S. Pat. No. 5,069,597 patented Dec. 3, 1991 to L. Doctor on an "Automatically Loading And Unloading Mechanism For Flat Removable Storage Elements"; and U.S. Pat. No. 5,112,181 patented May 12, 1992 to H. Rasmussen and assigned to Sanovo Engineering A/S on a "Feeding Apparatus For Transferring Eggs"; and U.S. Pat. No. 5,169,283 patented Dec. 8, 1992 to W. Covert on a "Basket Denester"; and U.S. Pat. No. 5,348,441 patented Sep. 20, 1994 to K. Takemasa et al and assigned to Sony Corporation on a "Parts Tray Conveying System"; and U.S. Pat. No. 5,391,051 patented Feb. 21, 1995 to L. Sabatier et al and assigned to Compagnie Generale d'Automatisme CGA-HBS on an "Unstacker For Unstacking Flat Items, The Unstacker Including Realignment Apparatus"; and U.S. Pat. No. 5,545,001 patented Aug. 13, 1996 to B. Capdeboscq and assigned to SA Martin on a "Station For Piling, Separating And Ejecting Batches Of Plate-Like Workpieces At An Outlet Of A Processing Machine"; and U.S. Pat. No. 5,556,252 patented Sep. 17, 1996 to R. Kuster and assigned to MAN Roland Druckmaschinen AG on a "Stack Lifting Apparatus And Method".

SUMMARY OF THE INVENTION

The present invention provides an apparatus which is designed for unstacking of trays in an automated fashion from a vertically extending interlocking stack of trays which are easily detachable. The apparatus preferably includes a frame which defines an input station and an output station thereon. The input station is adapted to receive the stacks of trays for separation and movement one at a time to the output station. Normally the input station is designed to receive the stacks of trays placed there manually which then may be supplied thereto by a conveyor but normally in that case the conveyor would receive manual placement of the stacks of trays or totes thereon. The output of the unstacking apparatus is normally positioned adjacent to some type of processing equipment. Such equipment normally is used for cleaning such as washing, rinsing, sanitizing and drying of such trays or totes to maintain the required level of cleanliness necessary for the specific industry with which the trays or totes are being used.

Within the frame means a main driveshaft is pivotally mounted. Preferably this driveshaft extends horizontally at a position intermediate between the input station and the output station. This main driveshaft is preferably pivotally movable through a 180 degree path of movement. A main beam is fixedly secured to the main shaft preferably and extends outwardly therefrom and is pivotally movable with the main driveshaft as it pivots through its approximately 180 degree path of movement. The main beam is preferably movable responsive to this movement between a position adjacent the input station and a position adjacent the output station. In this manner the main beam provides a means for moving of trays one at a time from the input station to the output station after which the main beam is relocated in the input station to allow removal of another tray. In this manner trays are successively removed from the top of a stack thereof to facilitate processing by machinery adjacent to the output station.

A main drive is also preferably included operatively secured with respect to the main driveshaft in such a manner as to selectively cause pivotal movement of the main beam between a position adjacent the input station and a position adjacent the output station.

An elevating platform is also preferably included mounted adjacent the input station of the frame. The elevating platform is preferably vertically movable between a lower elevator position adapted to receive stacks of interlocking trays and an upper elevator position to facilitate removal of trays one at a time from the stack of interlocking trays.

A tray gripping apparatus may be included mounted on the main beam such as to be movable therewith. This tray gripping apparatus is preferably operative to selectively grip a single tray from a stack of interlocking trays positioned upon the elevating platform within the input station and release these trays one at a time within the output station. Preferably the tray gripping apparatus further includes a pivot arm mounted on the main beam and pivotally movable with respect thereto. This pivot arm preferably includes a pivot arm gripping end defined thereon to facilitate gripping of the top tray of an interlocking stack. The gripping arm further defines a pivot arm driven end spatially disposed from the pivot arm gripping end which can be driven to facilitate pivotal movement of the pivot arm.

A gripping device may be included fixedly secured to the gripping pivot arm end of the pivotal arm such as to be movable therewith. This gripping member is preferably movable to a gripping position to grip a single tray from a position on top of a stack of interlocking trays sitting on the elevator platform. They are also removable to a releasing position to release a tray gripped as such. Movement of the gripping device between the gripping position and the releasing position is preferably responsive to pivotal movement of the pivot arm. The tray gripping apparatus is preferably adapted to urge the gripping device to the gripping position thereof only under those conditions where the main beam is located adjacent to the stack of trays within the input station. In this manner grasping will be facilitated of a tray from the top of the stack of trays located on the elevating platform. The tray gripping apparatus may also be adapted to urge the gripping device to the releasing position whenever the main beam is adjacent the outer station in order to facilitate release of the removed tray therein. The pivot arm may also be pivotally movable with respect to the frame means and define a vertically extending pivot axis to allow lateral movement of the pivot arm for urging movement of the gripping device laterally adjacent to a tray positioned upon a stack of trays within the input station in such a manner as to enhance gripping.

The configuration of the gripping device preferably includes an upper gripping member adapted to extend at least partially over the tray being gripped from the stack of trays within the input station in order to facilitate gripping. Also, the gripping device includes a lower gripping member adapted to extend at least partially under the tray being removed from the stack of trays within the input station in order to also facilitate gripping. The lower gripping member is preferably positioned at some distance from the upper gripping member in order to define a gripping slot therebetween for holding a tray therewithin during gripping and removal thereof from a stack of trays positioned on the elevating platform. This gripping slot preferably is C-shaped in order to facilitate gripping of individual trays.

An axially extensible member such as an hydraulic cylinder is preferably movably attached to the pivot arm driven end of the pivot arm. This axially extensible member is operable to move the gripping means between the gripping position and the releasing position responsive to axial extension thereof. This pivot arm is preferably pivotally secured with respect to the frame at a position intermediate between the pivot arm gripping end and the pivot arm driven end.

A stack retaining means is preferably mounted to the frame and is positioned adjacent to the input station. The stack retaining device is preferably operable to selectively retain trays of an interlocking stack thereof by urging a downward bias upon all trays within a stack below the uppermost stack which is to be removed.

This stack retaining device preferably includes a clamping arm means pivotally mounted with respect to the frame and movable between a clamping position within the input station above the elevating platform being engageable with respect to an interlocking stack of trays. The clamping arm means is also movable to a retracted position spatially disposed from the stack of interlocking trays positioned upon the elevating platform within the input station. The stack retaining device is preferably adapted to move the clamping arm thereof to the clamping position responsive to the main beam being moved adjacent a stack of trays within the input station in order to facilitate retaining of the remaining trays of a stack of interlocking trays positioned upon the elevator platform during removal of a tray from the stack of interlocking trays.

The stack retaining device also is adapted to move the clamping arm thereof to the retracted position whenever the main beam is moved away from the input station toward the output station in order to facilitate vertical repositioning of a stack of interlocking trays positioned upon the elevating platform by vertical movement of this platform.

A locking tab may also be included within the apparatus of the stack retaining means which extends outwardly from the individual clamping arms. These locking tabs are adapted to extend over at least a portion of the stack of trays positioned upon the elevating platform means within the input station in order to facilitate retaining of all trays within a stack thereof below the top tray on the elevating platform within the input station. The clamping arm is preferably pivotally mounted with respect to the frame and defines a horizontally extending pivot axis to allow lateral movement of the clamping arm for urging movement of the locking tab laterally into abutment with a stack of trays positioned within the input station for retaining same upon the elevating platform.

A clamping arm drive may be operatively secured to the clamping arm means for selectively urging movement thereof between the clamping position with the locking tab within the input station retaining a stack of trays on the elevated platform and the retracted position. The retracted position is defined when the locking tabs are withdrawn from the input station. The clamping arm drive includes an axially extensible clamping arm drive. A pivot shaft member may also be mounted horizontally pivotable with respect to the frame. The clamping arm is preferably fixedly mounted to the pivot shaft member.

A pivot shaft tab member is fixedly secured to the pivot shaft member and extends outwardly therefrom to facilitate control of pivotal movement thereof. The axially extensible clamping arm drive is operatively secured to the pivot shaft tab member to cause movement thereof and pivoting of the pivot shaft member responsive to axially extending movement of the axially extensible clamping device to facilitate clamping of a stack of trays upon the elevating platform means within the input station.

The apparatus of the present invention may also include a sensing means such as a photocell member affixed to the frame means and operative to sense the vertical positioning of a stack of interlocking trays upon the elevating platform. This photocell sensing means is operative to sense this vertical position in order to control vertical movement of the elevating platform device in order to facilitate repositioning of the uppermost tray at the same vertical position each time after removal of the tray in order to facilitate grasping and gripping thereof by the tray gripping apparatus of the present invention.

It is an object of the present invention to provide an apparatus for automatically unstacking trays from a vertically extending interlocking stack thereof wherein maintenance requirements are minimized.

It is an object of the present invention to provide an apparatus for automatically unstacking trays from a vertically extending interlocking stack thereof wherein equipment down time is minimized.

It is an object of the present invention to provide an apparatus for automatically unstacking trays from a vertically extending interlocking stack thereof wherein a number of moving parts is minimized.

It is an object of the present invention to provide an apparatus for automatically unstacking trays from a vertically extending interlocking stack thereof wherein complete automated handling of totes or trays is made possible.

It is an object of the present invention to provide an apparatus for automatically unstacking trays from a vertically extending interlocking stack thereof wherein stacks of dirty poultry totes can be unstacked for cleaning singly within a conveyor passing through a washing apparatus.

It is an object of the present invention to provide an apparatus for automatically unstacking trays from a vertically extending interlocking stack thereof wherein use with small as well as very large stacks of trays is made possible.

It is an object of the present invention to provide an apparatus for automatically unstacking trays from a vertically extending interlocking stack thereof wherein use with any type of a processing station which requires an input of trays one at a time is possible.

It is an object of the present invention to provide an apparatus for automatically unstacking trays from a vertically extending interlocking stack thereof wherein labor costs are significantly minimized.

It is an object of the present invention to provide an apparatus for automatically unstacking trays from a vertically extending interlocking stack thereof wherein use with poultry totes is significantly advantageous.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
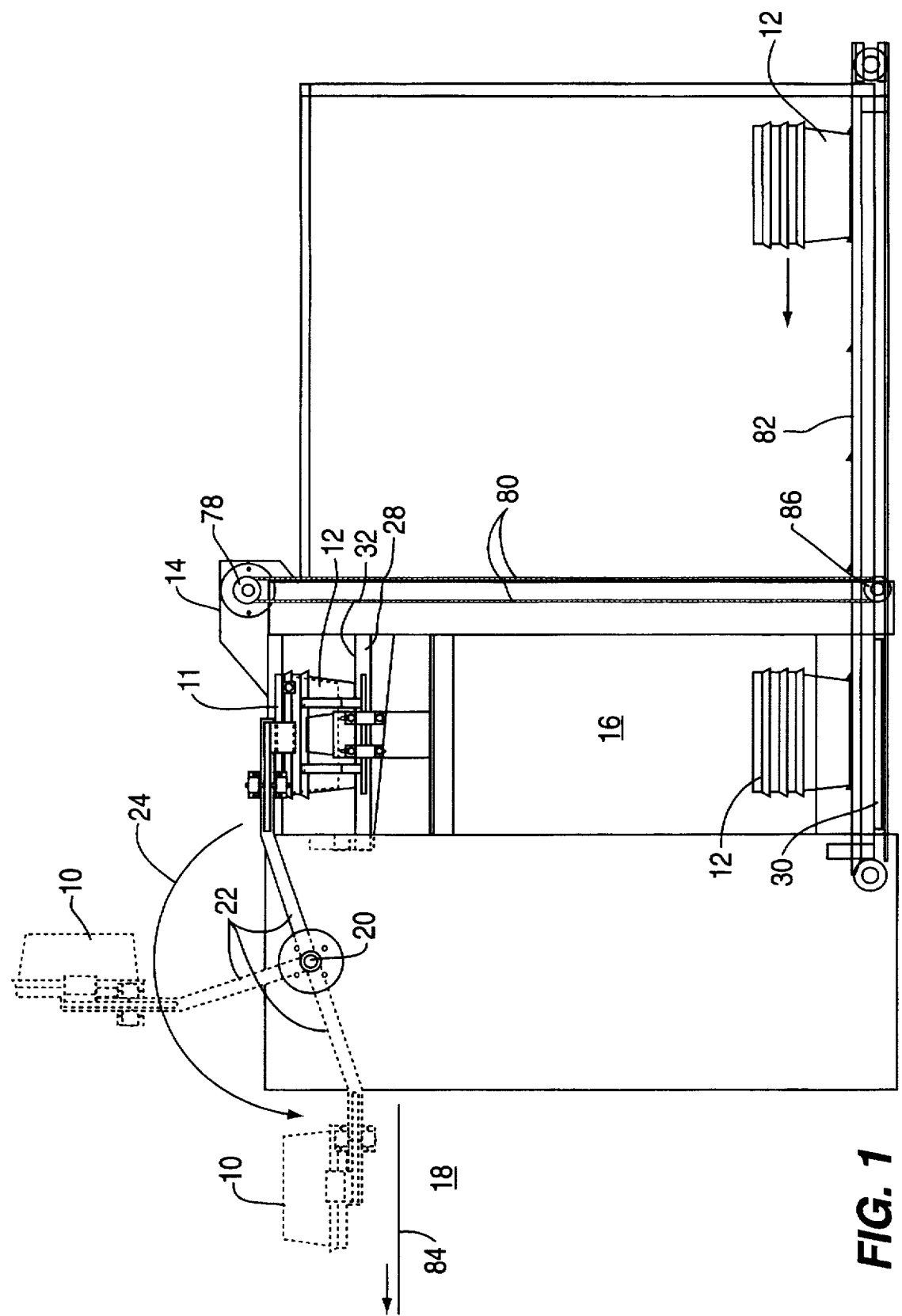
FIG. 1 is a side plan view of an embodiment of the apparatus of the present invention for automatically unstacking trays from a vertically extending interlocking stack thereof.

The present invention provides an apparatus for receiving stacks 12 of trays or totes 10. Such containers 10 are commonly used in many industries and, in particular, are used in the poultry industry for receiving and retaining chicks therein. Such trays 10 are often used in association with lids especially where slaughtered poultry is handled.

The present invention provides a means for unstacking a plurality of detachable yet interlocking trays 10 normally handled in stacks 12. The apparatus of the present invention includes a frame 14 which defines an input station 16 for receiving stacks of trays 10 and an output station 18 for receiving the trays individually which are removed one at a time from the top 11 of stack 12. This top tray 11 is removed one at a time from the input station 16 to the output station 18 for handling.

Under some operating circumstances an input conveyor 82 is provided which is adapted to convey stacks of trays 10 which need to be processed such as by washing thereof. Input conveyor 82 moves the tray stacks 12 to the input station 16 of the present invention. Within the input station 16 an elevating platform 28 is located.

Elevating platform 28 is movable vertically between a lower elevated position 30 for receiving stacks of trays 10 from the input conveyor 82 and the upper elevator position 32 wherein stacks of trays 12 are ready for unstacking.

Vertical movement of the elevator platform 28 is achieved by a platform chain 80 preferably in the form of a chain loop which is driven by a platform drive means 78. Drive means 78 can conventionally move the platform chain 80 around the chain sprockets 86. Chain 80 is fixedly secured to the elevating platform 28 such that operation of the platform drive 78 causes movement of the platform chain 80 about the chain sprockets 86 to cause movement of the elevating platform 28 vertically between the lower elevator position 30 and the upper elevator position 32 or to any position therebetween.

Figure 2:
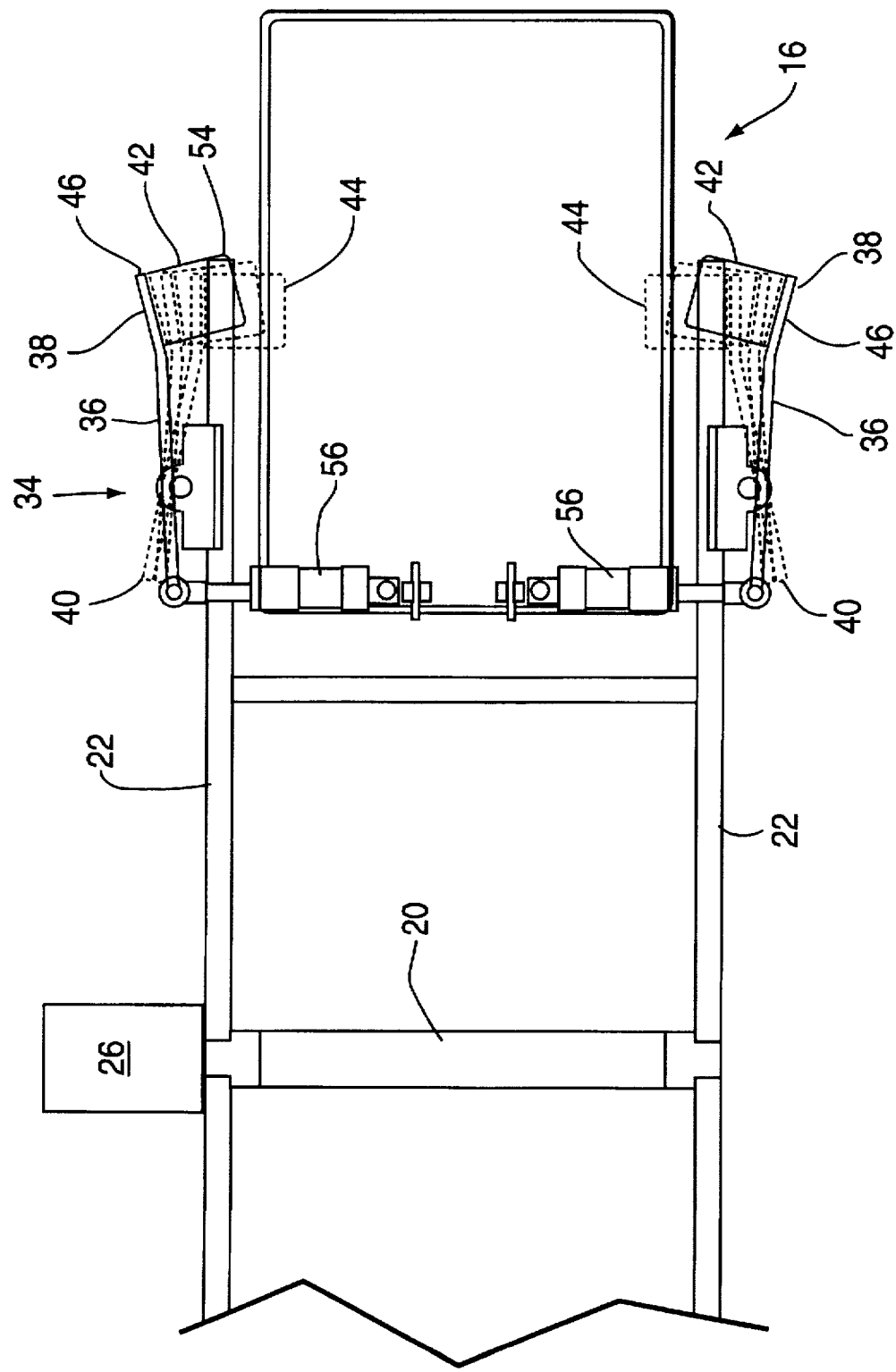
FIG. 2 is a top plan view of an embodiment of the apparatus of the present invention as shown in FIG. 1.

A main driveshaft means 20 is pivotally mounted within the frame 14. A main beam means 22 preferably in the form of two specific main beams as shown best in FIG. 2 are fixedly secured to the main driveshaft 20 and extend outwardly therefrom. Preferably pivotal movement of the main driveshaft 20 is possible through 180 degrees of movement in order to achieve a similar degree of movement capability in the main beam means. The main driveshaft 20 may be operatively secured with respect to a main drive 26 which urges movement of the main driveshaft 20 and the main beam 22 through the approximately 180 degrees of movement freedom.

Preferably the main drive 26 is capable of moving the main beam 22 to a position extending into or adjacent the input station 16 to pick up a tray for processing. The main drive means 26 is preferably capable of pivoting the main driveshaft 20 and thereby moving the main beam 22 to a position adjacent to the output station 18 preferably approximately 180 degrees from the position adjacent the input station 16.

To facilitate tray movement singly from the input station 16 to the output station 18 a tray gripping apparatus 34 may be included fixedly secured to the main beam 22. This tray gripping apparatus preferably includes a pivot arm 36 which includes a pivot arm gripping end 38 and a pivot arm driven end 40. A gripping means 42 is preferably secured to the pivot arm gripping end 38 and is movable with respect to the main beam 22. Preferably the gripping means 42 is movable between a gripping position 44 to facilitate the grasping of the top tray 11 of a stack 12 of trays 10 and a releasing position 46 for releasing thereof.

In specific, the configuration of the gripping means 42 is such that it is pivotable between the gripping position 44 and the releasing position 46 about the vertically extending pivot axis 48. This specific configuration of the gripping device includes an upper gripping member 50 preferably extending over at least a portion of the top tray 11 and the lower gripping member 52 spatially disposed from the upper gripping member 50 and extending under at least a portion of the top tray 11. With the upper and lower gripping members 50 and 52 spatially disposed from one another, a gripping slot means 54 is defined therebetween. This gripping slot means is preferably C-shaped to facilitate holding of the top or uppermost tray 11 therebetween. An axially extensible means 56 is operatively secured with respect to the pivot arm driven end 40 to achieve movement of the gripping means 42 between a gripping position 44 and a releasing position 46 selectively whether releasing or gripping of the top tray 11 is desired.

In a preferred configuration of the present invention as shown in FIG. 1, movement of the gripping means 42 to the gripping position 44 would be achieved when the main beam 22 is positioned within the input station 16. In this position the C-shaped gripping slot 54 will be positioned about both opposite sides of the top tray 11 for retaining thereof. The main drive 26 will then be activated causing the main shaft 20 to pivot and the main beam 22 to move through a 180 degree arc 24 of movement thereby transferring top tray 11 from the input station 16 to the output station 18. In this path of movement as shown in FIG. 1, the tray itself will invert due to the pivotal path of movement of main beam 22. This inversion does not in any way affect the capability of the gripping means 42 to firmly grip the tray 11 because of the shape of the gripping slot 54 such that it extends at least partially both above and below the tray thereby retaining it in place firmly.

Figure 3:
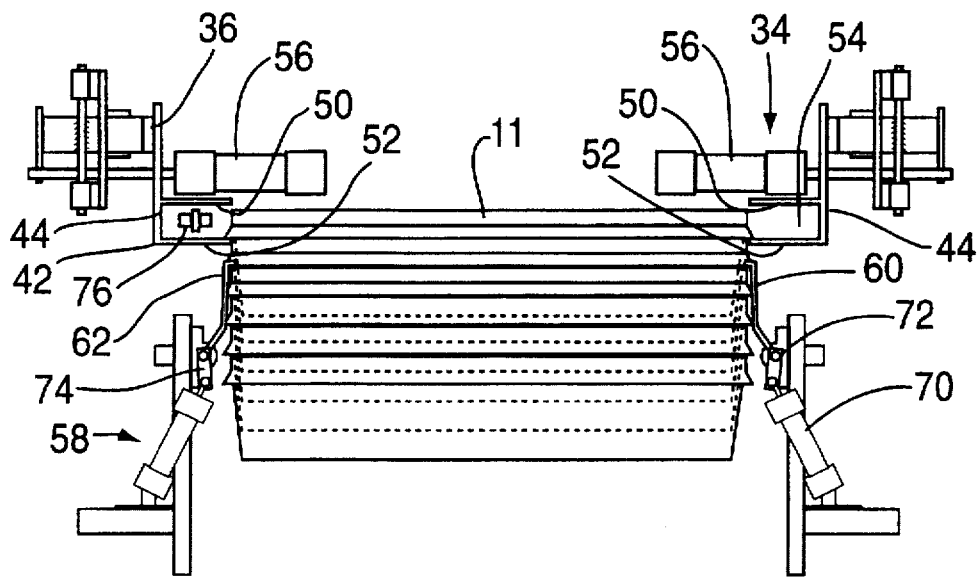
FIG. 3 is an end plan view of the apparatus shown in FIG. 1 with the tray gripping apparatus in the gripping position.
Figure 4:
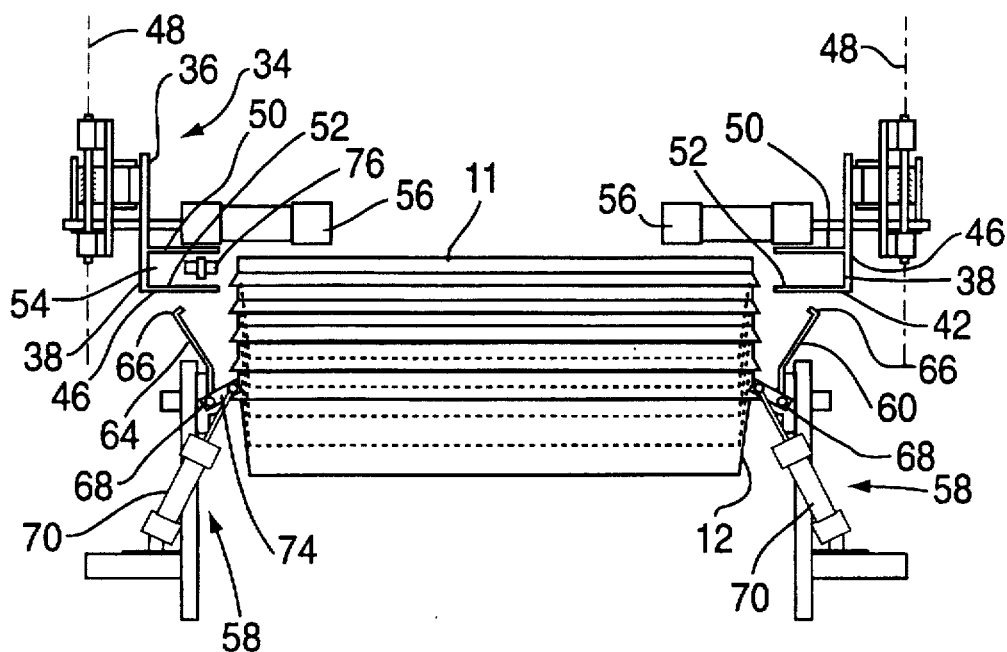
FIG. 4 is an end plan view of the apparatus shown in FIG. 1 with the tray gripping apparatus in the releasing position.

It has been found to be necessary in the apparatus of the present invention to provide a means for enhancing separation between the top tray 11 and the remaining trays 10 located within the stack 12. For this reason a stack retaining means 58 is included. This retaining means includes a clamping arm means 60 movable between a clamping position 62 and a retracted position 64 as shown in FIGS. 3 and 4. The clamping arm 60 includes a plurality of locking tabs 66 thereon adapted to extend above the remaining trays 10 within the stack 12 below the top tray 11. That is, the clamping arm 60 is adapted when moved to the clamped position 62 to position the locking tab 66 thereof above the uppermost tray within the remaining stack 12 below the top tray 11. Within the clamping position with tabs preferably extending from both sides, the remaining portion of the stack 12 will be urged downwardly toward the elevating platform 28 and thereby be clamped thereto. In this manner as the main beam 22 starts to pivot away from the input station 16 and toward the output station 18 separation between the top tray 11 and the remaining trays 10 within the stack 12 will be easily achievable.

The stack retaining device 58 preferably is pivotable through a horizontally extending pivot axis 68 formed preferably by a pivot shaft 72 extending horizontally. This pivot shaft member 72 preferably includes a pivot shaft tab 74 extending outwardly therefrom which is operatively secured with respect to a clamping arm drive 70. Such clamping arm drive 70 preferably is axially extensible and is movably secured to the pivot shaft tab member 74 such that axial extension and retraction of the clamping arm drive 70 will cause movement of the pivot shaft tab member 74 thereby in turn causing rotation of the pivot shaft member 72 about the horizontally extending pivot axis 68 thereof. In this manner the clamping arms 60 of the stack retaining device 58 will be selectively movable between a clamping position 62 and a retracted position 64.

It is desired that the clamping arms 60 be moved to the clamping position 62 immediately prior to engagement of the gripping means 42 to enhance separation of the top tray 11 from the remaining portion of the stack 12. It is also preferable that the clamping arm 60 be moved to the retracted position 64 immediately thereafter to allow vertical movement of the elevator platform 28 as necessary.

After each successive top tray 11 is removed from the stack of trays 12 it is preferable that the elevator platform 28 move upwardly through a distance necessary to bring the next or new top tray 11 to a position to be easily gripped by the gripping slot 54 of the gripping means 42. This vertical movement is controlled by operation of the platform drive 78 as linked through the platform chain 80 to the elevating platform 28 itself. In order to position the stack 12 properly such that the top tray 11 is ready for removal thereof, the present invention may preferably include a sensing means 76 as a photocell sensing means to be sure that the top tray 11 is always located at the same vertical position as the main beam 22 returns to the input station 16. This sensing means 76 preferably in the form of a photocell achieves this purpose by monitoring the vertical position of the top tray 11 of the current stack 12 positioned within the input station 16.

As the main beam 22 removes the top tray 11 it inverts the tray and transfers it through a 180 degrees arc 24 to the output station 18. Once the top tray 11 is located in the output station 18 the gripping means preferably will move from the gripping position 44 to the releasing position 46 thereby placing the removed tray in the output station 18. At this point the main beam 22 will start to pivot to return to the input station 16 for removing the next top tray 11 from the stack 12 positioned therein. The tray which has been released within the output station 18 can then be moved or is actually placed upon an output conveyor 84 to facilitate movement thereof as desired for processing such as refurbishing, cleaning, sanitizing or drying.

In operation, the apparatus of the present invention provides a means for receiving stacks 12 of trays 10 conveyed thereto on an input conveyor 82. The input conveyor 82 is adapted to move the stacks 12 into an input station 16 of the present invention. Input station 16 includes elevator platform 28 powered through a platform drive 78 and a platform chain 80 to move upwardly and carry the stack 12 of trays 10 thereon upwardly therewith. The elevator platform 28 will move upwardly until the top tray 11 is sensed by the photocell sensing means 76 to be in the correct position for removal thereof by the tray gripping apparatus of the present invention.

Once the top tray 11 is in the proper position for removal the main drive 26 can be activated to cause the main beam 22 to move into the input station 16 causing the tray gripping apparatus 34 to be positioned adjacent the top tray 11. The pivot arm 36 is then pivoted by operation of the axially extensible means 56 to cause movement of the gripping means to the gripping position 44 with the C-shaped gripping slot 54 extending about both sides of the top tray 11.

Once the top tray 11 is firmly grasped by gripping means 42 operation of the main drive 26 is initiated causing pivotal movement of the main beam 22 through approximately a 180 degree path of movement 24 from the input station 16 to the output station 18. Once the tray 11 is located in the output station 18 the gripping means 42 of the tray gripping apparatus 34 is moved to the releasing position 46 thereby dropping the tray 11 onto the output conveyor 84 for processing.

At this time the elevator platform 28 will be moved upwardly by operation of the platform drive 78 until the photocell sensing means 76 senses that the new top tray 11 of the stack 12 is in the proper position for gripping and removal thereof. Then the main drive 26 will be operated in an opposite direction to cause movement of the main beam 22 from the output station 18 to the input station 16. Once the main beam 22 is positioned within the input station 16 with the tray gripping apparatus 34 adjacent the new top tray 11 of stack 12 the gripping apparatus 42 can be activated to move to the gripping position 44 to restart the cycle again.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An apparatus for automatically unstacking trays from a vertically extending interlocking stack thereof comprising:
   A. a frame means defining an input station means and an output station means therein, said input station means being adapted to receive stacks of vertically interlocking trays for separation and movement thereof singly to said output station means;
   B. a main driveshaft means pivotally mounted within said frame means at a position between said input station means and said output station means;
   C. a main beam means fixedly secured to said main driveshaft means and extending outwardly therefrom and being pivotable with said main driveshaft means, said main beam means being movable responsive to pivotal movement of said main driveshaft means between a position adjacent said input station means for removing a tray from a stack thereof and a position adjacent said output station means for placing a removed tray therein;
   D. a main drive means operatively secured to said main driveshaft means to selectively cause pivotal movement of said main beam means between a position adjacent said input station means and a position adjacent said output station means;
   E. an elevating platform means mounted adjacent said input station means of said frame means and being vertically movable between a lower elevator position adapted to receive stacks of interlocking trays and an upper elevator position to facilitate removal of trays singly from a stack of interlocking trays;
   F. a tray gripping apparatus mounted on said main beam means and movable therewith, said tray gripping apparatus being operative to selectively grip a single tray from atop a stack of interlocking trays positioned upon said elevating platform means within said input station means and release same within said output station means, said tray gripping apparatus comprising;
      (1) a pivot arm means mounted on said main beam means and being pivotally movable with respect thereto, said pivot arm means including a pivot arm gripping end means thereof for facilitating selective gripping of a top tray on an interlocking stack thereof and further including a pivot arm driven end means thereof spatially disposed from said pivot arm gripping end means thereof;
      (2) a gripping means fixedly secured to said pivot arm gripping end means of said pivot arm means and movable therewith, said gripping means being movable to a gripping position to grip a single tray from a stack of interlocking trays positioned upon said elevating platform means and being movable to a releasing position to release same, movement of said gripping means between said gripping position and said releasing position being responsive to pivotal movement of said pivot arm means;
      (3) an axially extensible means movably attached to said pivot arm driven end means of said pivot arm means, said axially extensible means being operable to move said gripping means between said gripping position and said releasing position responsive to axial extensible movement thereof;
   G. a stack retaining means mounted to said frame means and positioned adjacent said input station means, said stack retaining means being operative to selectively retain trays of an interlocking stack thereof below the uppermost tray downwardly with respect to said elevating platform means therebelow, said stack retaining means comprising;
      (1) a clamping arm means pivotally mounted with respect to said frame means and being movable between a clamping position within said input station means above said elevating platform means being engageable with respect to an interlocking stack of trays and a retracted position spatially disposed from the stack of interlocking trays positioned upon said elevating platform means within said input station means;
      (2) a locking tab means extending outwardly from said clamping arm means and adapted to extend over at least a portion of a stack of trays positioned upon said elevating platform means within said input station means to facilitate retaining of all trays within a stack thereof below the top tray on said elevating platform means within said input station means; and
      (3) a clamping arm drive means operatively secured to said clamping arm means for selectively urging movement thereof between the clamping position with said locking tab means within said input station means retaining a stack of trays on said elevating platform means and the retracted position with said locking tab means withdrawn from said input station means.

2. An apparatus for automatically unstacking trays from a vertically extending interlocking stack thereof as defined in claim 1 wherein said main driveshaft means is pivotally secured to said frame means extending generally horizontally therethrough.

3. An apparatus for automatically unstacking trays from a vertically extending interlocking stack thereof as defined in claim 1 wherein said main driveshaft means and said main beam means pivot through approximately 180 degrees to move said tray gripping apparatus from said input station means to said output station means.

4. An apparatus for automatically unstacking trays from a vertically extending interlocking stack thereof as defined in claim 3 wherein a tray retained by said tray gripping apparatus is inverted during movement through approximately 180 degrees from said input station means to said output station means.

5. An apparatus for automatically unstacking trays from a vertically extending interlocking stack thereof as defined in claim 1 wherein said tray gripping apparatus is adapted to urge said gripping means to the gripping position thereof responsive to said main beam means being adjacent a stack of trays within said input station means to facilitate grasping of a tray from the top of a stack of trays located on said elevating platform means.

6. An apparatus for automatically unstacking trays from a vertically extending interlocking stack thereof as defined in claim 1 wherein said tray gripping apparatus is adapted to urge said gripping means to the releasing position thereof responsive to said main beam means being adjacent said output station means to facilitate release of a removed tray for placement into said output station means.

7. An apparatus for automatically unstacking trays from a vertically extending interlocking stack thereof as defined in claim 1 wherein said stack retaining means is adapted to move said clamping arm means thereof to the clamping position responsive to said main beam means being moved adjacent a stack of trays within said input station means to facilitate retaining of the remaining trays of a stack of interlocking trays positioned upon said elevating platform means during removal of a tray from the stack of interlocking trays located thereon.

8. An apparatus for automatically unstacking trays from a vertically extending interlocking stack thereof as defined in claim 1 wherein said stack retaining means is adapted to move said clamping arm means thereof to the retracted position responsive to said main beam means being moved away from said input station means toward said output station means to facilitate vertical repositioning of the stack of interlocking trays positioned upon said elevating platform means by vertical movement thereof.

9. An apparatus for automatically unstacking trays from a vertically extending interlocking stack thereof as defined in claim 1 further comprising a sensing means affixed to said frame means and operative to sense the vertical positioning of a stack of interlocking trays upon said elevating platform means.

10. An apparatus for automatically unstacking trays from a vertically extending interlocking stack thereof as defined in claim 9 wherein said sensing means is a photocell sensing means and is operative to sense the vertical position of a stack of interlocking trays to control vertical movement by said elevating platform means to facilitate removal of trays singly therefrom by said tray gripping apparatus.

11. An apparatus for automatically unstacking trays from a vertically extending interlocking stack thereof as defined in claim 1 wherein said gripping means includes:
  A. an upper gripping member adapted to extend at least partially over the tray being removed from the stack of trays within said input station means; and
  B. a lower gripping member adapted to extend at least partially under the tray being removed from the stack of trays within said input station means, said lower gripping member being spatially disposed from said upper gripping member to define a gripping slot means therebetween for holding a tray therebetween during gripping and removal thereof from a stack of trays positioned on said elevating platform means within said input station means.

12. An apparatus for automatically unstacking trays from a vertically extending interlocking stack thereof as defined in claim 11 wherein said gripping slot, means is C-shaped to facilitate gripping of a tray between said upper gripping member and said lower gripping member.

13. An apparatus for automatically unstacking trays from a vertically extending interlocking stack thereof as defined in claim 1 wherein said pivot arm means is pivotally movable with respect to said frame means and defines a vertically extending pivot axis to allow lateral movement of said pivot arm means for urging movement of said gripping means thereof laterally adjacent to a tray positioned upon a stack of trays within said input station means to facilitate gripping and removal thereof.

14. An apparatus for automatically unstacking trays from a vertically extending interlocking stack thereof as defined in claim 1 wherein said clamping arm means is pivotally movable with respect to said frame means and defines a horizontally extending pivot axis to allow lateral movement of said clamping arm means for urging movement of said locking tab means laterally into abutment with a stack of trays positioned within said input station means for retaining same upon said elevating platform means.

15. An apparatus for automatically unstacking trays from a vertically extending interlocking stack thereof as defined in claim 14 wherein said stack retaining means includes a pivot shaft member mounted horizontally pivotable with respect to said frame means, said clamping arm means being fixedly mounted to said pivot shaft member.

16. An apparatus for automatically unstacking trays from a vertically extending interlocking stack thereof as defined in claim 15 wherein said pivot shaft member includes a pivot shaft tab member fixedly secured thereto and extending outwardly therefrom to facilitate control of pivotal movement thereof.

17. An apparatus for automatically unstacking trays from a vertically extending inter locking stack thereof as defined in claim 16 wherein said clamping arm drive means comprises an axially extensible clamping arm drive means being operatively secured to said pivot shaft tab member to cause movement thereof and pivoting of said pivot shaft member responsive to axially extending movement of said axially extensible clamping arm drive means to facilitate clamping of a stack of trays upon said elevating platform means within said input station means.

18. An apparatus for automatically unstacking trays from a vertically extending interlocking stack thereof as defined in claim 1 wherein said pivot arm means is pivotally secured to said frame means at a position intermediate between said pivot arm gripping end means and said pivot arm driven end means.

19. An apparatus for automatically unstacking trays from a vertically extending interlocking stack thereof comprising:
  A. a frame means defining an input station means and an output station means therein, said input station means being adapted to receive stacks of vertically interlocking trays for separation and movement thereof singly to said output station means;
  B. a main driveshaft means pivotally mounted within said frame means at a position between said input station means and said output station means;
  C. a main beam means fixedly secured to said main driveshaft means and extending outwardly therefrom and being pivotable with said main driveshaft means, said main beam means being movable responsive to pivotal movement of said main driveshaft means between a position adjacent said input station means for removing a tray from a stack thereof and a position adjacent said output station means for placing a removed tray therein;

D. a main drive means operatively secured to said main driveshaft means to selectively cause pivotal movement of said main beam means between a position adjacent said input station means and a position adjacent said output station means;

E. an elevating platform means mounted adjacent said input station means of said frame means and being vertically movable between a lower elevator position adapted to receive stacks of interlocking trays and an upper elevator position to facilitate removal of trays singly from a stack of interlocking trays;

F. a tray gripping apparatus mounted on said main beam means and movable therewith, said tray gripping apparatus being operative to selectively grip a single tray from a stack of interlocking trays positioned upon said elevating platform means within said input station means and release same within said output station means, said tray gripping apparatus comprising;

(1) a pivot arm means mounted on said main beam means and being pivotally movable with respect thereto, said pivot arm means including a pivot arm gripping end means thereof for facilitating selective gripping of a top tray on an interlocking stack thereof and further including a pivot arm driven end means thereof spatially disposed from said pivot arm gripping end means thereof;

(2) a gripping means fixedly secured to said pivot arm gripping end means of said pivot arm means and movable therewith, said gripping means being movable to a gripping position to grip a single tray from a stack of interlocking trays positioned upon said elevating platform means and being movable to a releasing position to release same, movement of said gripping means between said gripping position and said releasing position being responsive to pivotal movement of said pivot arm means, said tray gripping apparatus being adapted to urge said gripping means to the gripping position thereof responsive to said main beam means being adjacent a stack of trays within said input station means to facilitate grasping of a tray from the top of a stack of trays located on said elevating platform means, said tray gripping apparatus being further adapted to urge said gripping means to the releasing position thereof responsive to said main beam means being adjacent said output station means to facilitate release of a removed tray for placement into said output station means, said gripping means further including:

(a) an upper gripping member adapted to extend at least partially over the tray being removed from the stack of trays within said input station means to facilitate gripping thereof;

(b) a lower gripping member adapted to extend at least partially under the tray being removed from the stack of trays within said input station means to facilitate gripping thereof, said lower gripping member being spatially disposed from said upper gripping member to define a gripping slot means therebetween for holding a tray therebetween during gripping and removal thereof from a stack of trays positioned on said elevating platform means within said input station means, said gripping slot means being C-shaped to facilitate gripping of a tray;

(3) an axially extensible means movably attached to said pivot arm driven end means of said pivot arm means, said axially extensible means being operable to move said gripping means between said gripping position and said releasing position responsive to axial extension thereof;

G. a stack retaining means mounted to said frame means and positioned adjacent said input station means, said stack retaining means being operative to selectively retain trays of an interlocking stack thereof below the uppermost tray downwardly with respect to said elevating platform means therebelow, said stack retaining means comprising;

(1) a clamping arm means pivotally mounted with respect to said frame means and being movable between a clamping position within said input station means above said elevating platform means being engageable with respect to an interlocking stack of trays and a retracted position spatially disposed from the stack of interlocking trays positioned upon said elevating platform means within said input station means, said stack retaining means being adapted to move said clamping arm means thereof to the clamping position responsive to said main beam means being moved adjacent a stack of trays within said input station means to facilitate retaining of the remaining trays of a stack of interlocking trays positioned upon said elevating platform means during removal of a tray from the stack of interlocking trays located thereon, said stack retaining means being adapted to move said clamping arm means thereof to the retracted position responsive to said main beam means being moved away from said input station means toward said output station means to facilitate vertical repositioning of the stack of interlocking trays positioned upon said elevating platform means by vertical movement thereof;

(2) a locking tab means extending outwardly from said clamping arm means and adapted to extend over at least a portion of a stack of trays positioned upon said elevating platform means within said input station means to facilitate retaining of all trays within a stack thereof below the top tray on said elevating platform means within said input station means; and (3) a clamping arm drive means operatively secured to said clamping arm means for selectively urging movement thereof between the clamping position with said locking tab means within said input station means retaining a stack of trays on said elevating platform means and the retracted position with said locking tab means withdrawn from said input station means.

20. An apparatus for automatically unstacking trays from a vertically extending interlocking stack thereof comprising:

A. a frame means defining an input station means and an output station means therein, said input station means being adapted to receive stacks of vertically interlocking trays for separation and movement thereof singly to said output station means;

B. a main driveshaft means pivotally mounted to and extending horizontally within said frame means at a position between said input station means and said output station means, said main driveshaft means being pivotally movable through 180 degrees during movement from said input station means to said output station means to invert a retained tray during movement therebetween;

C. a main beam means fixedly secured to said main driveshaft means and extending outwardly therefrom and being pivotable with said main driveshaft means, said main beam means being movable responsive to pivotal movement of said main driveshaft means between a position adjacent said input station means for removing a tray from a stack thereof and a position adjacent said output station means for placing a removed tray therein;

D. a main drive means operatively secured to said main driveshaft means to selectively cause pivotal movement of said main beam means between a position adjacent said input station means and a position adjacent said output station means;

E. an elevating platform means mounted adjacent said input station means of said frame means and being vertically movable between a lower elevator position adapted to receive stacks of interlocking trays and an upper elevator position to facilitate removal of trays singly from a stack of interlocking trays;

F. a tray gripping apparatus mounted on said main beam means and movable therewith, said tray gripping apparatus being operative to selectively grip a single tray from a stack of interlocking trays positioned upon said elevating platform means within said input station means and release same within said output station means, said tray gripping apparatus comprising;

(1) a pivot arm means mounted on said main beam means and being pivotally movable with respect thereto, said pivot arm means including a pivot arm gripping end means thereof for facilitating selective gripping of a top tray on an interlocking stack thereof and further including a pivot arm driven end means thereof spatially disposed from said pivot arm gripping end means thereof;

(2) a gripping means fixedly secured to said pivot arm gripping end means of said pivot arm means and movable therewith, said gripping means being movable to a gripping position to grip a single tray from a stack of interlocking trays positioned upon said elevating platform means and being movable to a releasing position to release same, movement of said gripping means between said gripping position and said releasing position being responsive to pivotal movement of said pivot arm means, said tray gripping apparatus being adapted to urge said gripping means to the gripping position thereof responsive to said main beam means being adjacent a stack of trays within said input station means to facilitate grasping of a tray from the top of a stack of trays located on said elevating platform means, said tray gripping apparatus being further adapted to urge said gripping means to the releasing position thereof responsive to said main beam means being adjacent said output station means to facilitate release of a removed tray for placement into said output station means, said pivot arm means being pivotally movable with respect to said frame means and defining a vertically extending pivot axis to allow lateral movement of said pivot arm means for urging movement of said gripping means laterally adjacent to a tray positioned upon a stack of trays within said input station means to facilitate gripping, said gripping means further including:

(a) an upper gripping member adapted to extend at least partially over the tray being removed from the stack of trays within said input station means to facilitate gripping thereof;

(b) a lower gripping member adapted to extend at least partially under the tray being removed from the stack of trays within said input station means to facilitate gripping thereof, said lower gripping member being spatially disposed from said upper gripping member to define a gripping slot means therebetween for holding a tray therebetween during gripping and removal thereof from a stack of trays positioned on said elevating platform means within said input station means, said gripping slot means being C-shaped to facilitate gripping of a tray;

(3) an axially extensible means movably attached to said pivot arm driven end means of said pivot arm means, said axially extensible means being operable to move said gripping means between said gripping position and said releasing position responsive to axial extension thereof, said pivot arm means being pivotally secured to said frame means at a position intermediate between said pivot arm gripping end means and said pivot arm driven end means;

G. a stack retaining means mounted to said frame means and positioned adjacent said input station means, said stack retaining means being operative to selectively retain trays of an interlocking stack thereof below the uppermost tray downwardly with respect to said elevating platform means therebelow, said stack retaining means comprising;

(1) a clamping arm means pivotally mounted with respect to said frame means and being movable between a clamping position within said input station means above said elevating platform means being engageable with respect to an interlocking stack of trays and a retracted position spatially disposed from the stack of interlocking trays positioned upon said elevating platform means within said input station means, said stack retaining means being adapted to move said clamping arm means thereof to the clamping position responsive to said main beam means being moved adjacent a stack of trays within said input station means to facilitate retaining of the remaining trays of a stack of interlocking trays positioned upon said elevating platform means during removal of a tray from the stack of interlocking trays located thereon, said stack retaining means being adapted to move said clamping arm means thereof to the retracted position responsive to said main beam means being moved away from said input station means toward said output station means to facilitate vertical repositioning of the stack of interlocking trays positioned upon said elevating platform means by vertical movement thereof;

(2) a locking tab means extending outwardly from said clamping arm means and adapted to extend over at least a portion of a stack of trays positioned upon said elevating platform means within said input station means to facilitate retaining of all trays within a stack thereof below the top tray on said elevating platform means within said input station means, said clamping arm means being pivotally movable with respect to said frame means and defining a horizontally extending pivot axis to allow lateral movement of said clamping arm means for urging movement of said locking tab means laterally into abutment with a stack of trays positioned within said input station means for retaining same upon said elevating platform means;

(3) a clamping arm drive means operatively secured to said clamping arm means for selectively urging movement thereof between the clamping position with said locking tab means within said input station means retaining a stack of trays on said elevating platform means and the retracted position with said locking tab means withdrawn from said input station means, said clamping arm drive means comprising an axially extensible clamping arm drive means;

(4) a pivot shaft member mounted horizontally pivotable with respect to said frame means, said clamping arm means being fixedly mounted to said pivot shaft member;

(5) a pivot shaft tab member fixedly secured to said pivot shaft member and extending outwardly therefrom to facilitate control of pivotal movement thereof, said axially extensible clamping arm drive means being operatively secured to said pivot shaft tab member to cause movement thereof and pivoting of said pivot shaft member responsive to axially extending movement of said axially extensible clamping arm drive means to facilitate clamping of a stack of trays upon said elevating platform means within said input station means; and H. a photocell sensing means affixed to said frame means and operative to sense the vertical positioning of a stack of interlocking trays upon said elevating platform means, said photocell sensing means being operative to sense the vertical position of a stack of interlocking trays to control vertical movement by said elevating platform means to facilitate removal of trays singly therefrom by said tray gripping apparatus.

* * * * *